Aug. 8, 1967     A. J. L. MORAIN     3,335,048
MOSAIC TILE ASSEMBLY
Filed Feb. 18, 1964     2 Sheets-Sheet 1
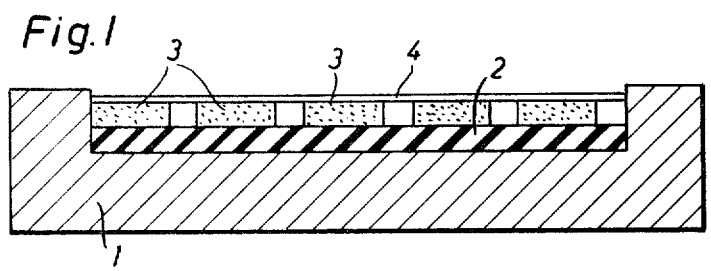
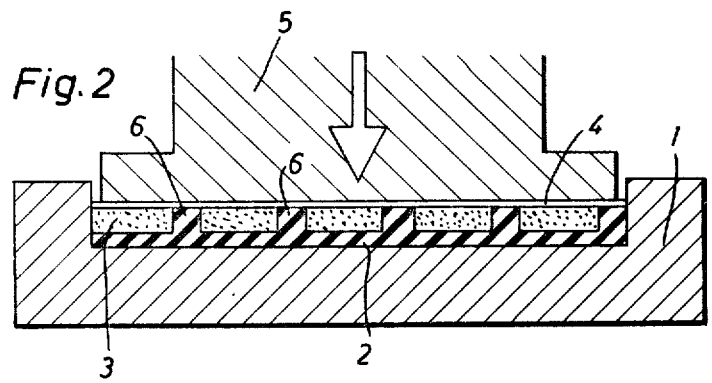
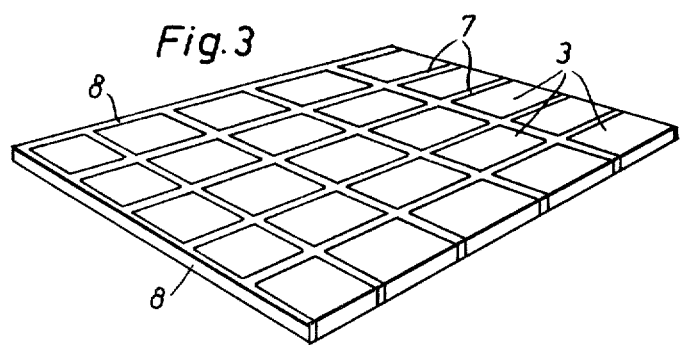

Aug. 8, 1967   A. J. L. MORAIN   3,335,048
MOSAIC TILE ASSEMBLY
Filed Feb. 18, 1964   2 Sheets-Sheet 2
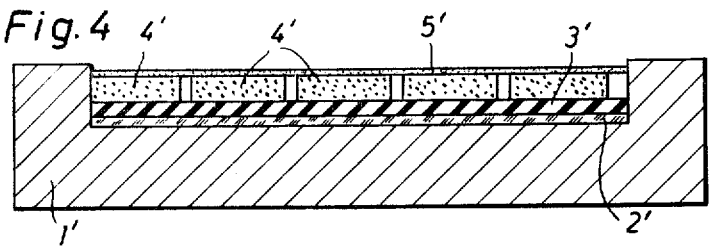
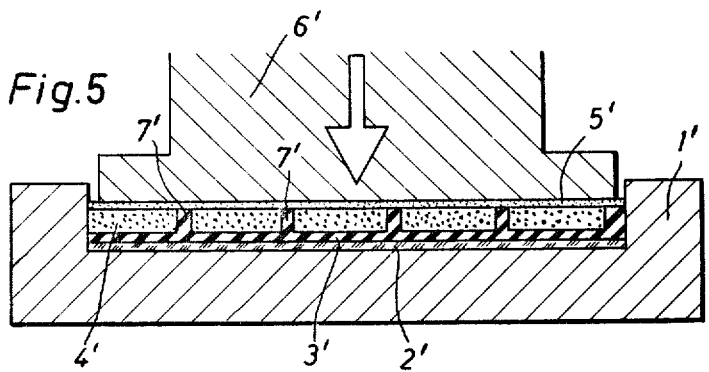
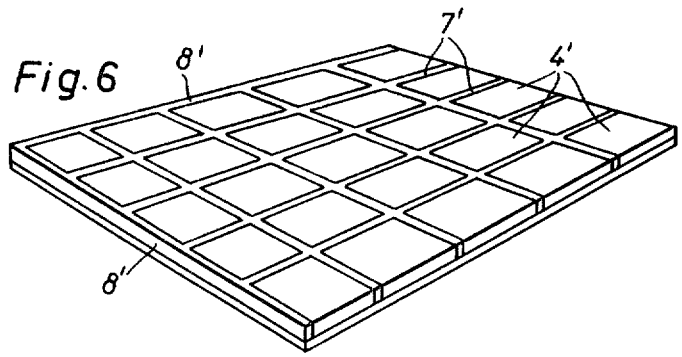

3,335,048
MOSAIC TILE ASSEMBLY
Andre Jean Leon Morain, Paris, France, assignor to Societe des Lieges des Hamendas et de la Petite Kabylie, Paris, France
Filed Feb. 18, 1964, Ser. No. 345,730
Claims priority, application France, Feb. 19, 1963, 925,307, Patent 1,357,039; May 28, 1963, 936,218, Patent 1,366,850
2 Claims. (Cl. 161—38)

The present in vention relates to a composite tile plate and the method of making the same and, more particularly, to a mosaic type composite tile plate provided with a thermally and acoustically insulating support.

Conventionally, tile floors are made by embedding the individual tiles of ceramic or similar material in a layer of mortar which does not possess any insulating properties and also lacks completely in resiliency.

It is an object of the present invention to provide a composite tile plate which will possess insulating properties, particularly acoustically and thermally insulating properties and which, when applied to a support will also possess a certain degree of resiliency.

It is a further object of the present invention to provide a method of producing such composite tile plates.

Other objects and advantages of the present invention will become apparent from a further reading of the description and of the appended claims.

With the above and other objects in view the present invention is concerned with a mosaic type composite tile plate, comprising, in combination, a bottom layer of acoustically insulating material, a plurality of individual tile elements having upper faces and located spaced from each other in one plane above the bottom layer with the upper faces thereof exposed, and a vulcanized, flexible layer interposed between and adhering to the bottom layer and to the individual tile elements and filling the interstices between the latter.

The present invention also includes the method of producing a mosaic type tile plate, comprising the steps of superposing in the indicated sequence a first layer of acoustically insulating material, a second layer of vulcanizable material and a plurality of individual tile elements adhered spaced from each other to a supporting sheet with the individual tile elements contacting the vulcanizable layer, subjecting the thus formed assembly to heat and pressure so as to vulcanize the layer of vulcanizable material and adhering the same to the layer of acoustically insulating material while simultaneously embedding the individual tile elements in the second layer with portions thereof filling the interstices between the spaced individual tile elements and also adhering the individual tile elements to the second layer, allowing the thus coherent assembly to cool and removing the supporting sheet.

Thus, the present invention is concerned with composite tile plates which are formed in a mosaic like manner of small preferably square or rectangular tiles which are arranged side by side but spaced from each other and which adhere to a supporting layer formed of a thermally and acoustically insulating substance with the interstices between the individual small tiles being filled with the insulating material of the supporting layer. The invention is also concerned with a process of making such composite tile plates by forming in a mold a vulcanizable supporting layer, placing on top thereof the spaced individual small tile elements and combining the support and said tile elements by application of heat and pressure.

The supporting layer preferably will be formed of vulcanizable rubber base which will be vlucanized during the application of heat and pressure as described above.

The plurality of small tile elements is preferably pre-assembled on a temporary support such as a sheet of kraft paper adhering thereto but slightly so that when the tile assembly is placed with the free faces of the tiles in contact with the supporting layer and pressed against the same, the kraft paper can be torn off and the individual tile elements will remain in contact with the supporting layer.

The tile assemblies of the present invention can be easily applied, for instance, as floor covering by gluing the supporting layer to the floor which is to be covered and the thus obtained tiled floor will not only possess thermally and acoustically insulating properties but also non-skidding properties due to the filling of the interstices between the individual tile elements with the vulcanized material of the supporting layer of the tile plate.

The insulating support of a tile assembly such as described above should have several different and, to some extent, mutually exclusive qualities.

On the one hand, the composite tile plate should have excellent acoustically insulating properties and for this purpose a layer of cork or of an agglomerated mass of cork particles would be highly suitable. On the other hand, the support should also possess considerable resistance against mechanical attack and a certain degree of resiliency. With respect to these latter properties, cork layers give very little satisfaction. Natural or synthetic rubber possesses a high degree of flexibility and resistance against mechanical attack but gives only mediocre results with respect to acoutic insulation. Furthermore, the cost of rubber layers is relatively high while the total cost of the tile plate and particularly of the supporting layer thereof should be kept at a minimum in order to make the composite tile plate commercially attractive. Finally, it is, of course, important that the adherence of the individual tile elements to the supporting layer should be firm and permanent.

It is therefore a further object of the present invention to provide pre-assembled composite tile plates which include a thermally and acoustically insulating support which fulfills all of the above-discussed requirements.

Moreover, the present invention is concerned with a pre-fabricated tile assembly which comprises tiles of ceramic or similar material which are assembled on and adhered to an insulating support which consists of two layers, namely, a first layer in direct contact with the tiles and filling the joints therebetween, which first layer consists of rubber or of a vulcanized mixture containing a major proportion or consisting predominantly of rubber, and a second lowermost layer of acoustically insulating material.

Preferably, but not necessarily, the second or base layer will consist of cork or of an agglomeration of cork particles or of a mixture containing a major proportion of cork and a small proportion of rubber. However, also other acoustically insulating materials may be used for making the second or lowermost layer.

The present invention is also concerned with the method of producing such tile assemblies. This method consists essentially in superposing tiles of ceramic or similar material which cannot be joined directly to each other onto a vulcanizable first layer which in turn is superposed on a second layer of acoustically insulating material, and to form a firm assembly by applying pressure at an elevated temperature such that the material of the first layer will be vulcanized and, due to the applied pressure will rise in part to fill the interstices between the individual tile elements.

Preferably, but not necessarily, the contacting lower faces of the individual tile elements, the upper and lower faces of the intermediate first layer and the upper face of the second lowermost layer are coated with a contact adhesive prior to forming the assembly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic elevational view in cross-section of a mold having arranged therein the elements required for forming a composite tile plate having a single supporting layer;

FIG. 2 illustrates the assembly of FIG. 1 during application of heat and pressure thereto;

FIG. 3 is a perspective view of the composite tile plate formed by the method illustrated in FIGS. 1 and 2;

FIG. 4 is a schematic elevational cross-sectional view of an assembly for forming a composite tile plate having two supporting layers of different properties;

FIG. 5 illustrates the application of heat and pressure to the assembly shown in FIG. 4; and FIG. 6 is a perspective view of a mosaic type composite tile plate formed as illustrated in FIGS. 4 and 5.

Referring first to the embodiment illustrated in FIGS. 1–3, a vulcanizable rubber mixture or a vulcanizable mixture of cork and rubber is prepared and is drawn out into thin sheets having a thickness of, for instance, 2 mm.

The composition of this sheet may vary greatly. Necessarily it will contain a major proportion of natural rubber such as smoked sheets or crepe, or of synthetic rubber, for instance, butadiene-styrene rubber which is available under the trademark Kyrlene 602. This vulcanizable portion of the mixture will amount to between about 30 and 60% thereof. The balance will be composed of materials which are inert with respect to vulcanization and which will serve as acoustic and thermal insulators such as cork, kaolin, plastifiers, for instance, such as coumarone, stearine or mineral oils, anti-oxidants, for instance, such as are available under the trademark Permanax, vulcanization accelerators such as sulfur or benzothiazyle disulfide known as Accelerator 201, tetramethylthiourame disulfide known as Accelerator 501, basic materials such as lime or calcined magnesia known under the trademark Maglite which are included for the purpose of neutralizing the acidity of the cork, softeners such as Renacit V to facilitate the working of the rubber and reinforcing agents such as carbon black or silicon dioxide, for instance, of the type known as P 45.

The following example of a composition of a single supporting layer is given as illustrative only without limiting the invention to the specific details thereof.

EXAMPLE I

|  | Percent by weight |
| --- | --- |
| Krylene 602 | 49.50 |
| Renacit V | 0.5 |
| Coumarone | 5 |
| Sulfur | 1.5 |
| Permanax | 0.5 |
| Zinc oxide | 2.5 |
| Maglite | 1.5 |
| P 45 | 1.5 |
| Kaolin | 9.5 |
| Carbon black | 14.0 |
| Lime | 4.5 |
| Stearine | 0.25 |
| Mineral oil | 0.5 |
| Accelerator 201 | 0.25 |
| Accelerator 501 | 0.25 |
| Cork | 7.25 |

As pointed out above, this composition is given as an example only and the layer may also be made of compositions which can be vulcanized and which contain in addition to rubber and cork varying quantities of plastifiers, anti-oxidants, softeners, vulcanizing agents, reinforcing materials, inert bulk materials and basic materials for counteracting the acidity of the cork. For instance, with reference to Example I, the percentage by weight of various constituents may be within the following ranges:

|  | Percent by weight |
| --- | --- |
| Peptizer | 0.2 to 0.6 |
| Coumarone | 1.5 to 6 |
| Sulfur | 0.5 to 2 |
| Zinc oxide | 0.5 to 5 |
| Silica | 5 to 20 |
| Carbon black | 5 to 15 |
| Mineral oil | 2 to 10 |
| Cork | 2 to 50 |

After cooling a sheet prepared in conventional manner of a mixture such as described above, the sheet is cut to the dimensions of the mold and coated with glue on one of its sides.

A sheet of kraft paper is cut to the same dimensions and the individual tile elements are removably adhered to one face of the kraft paper spaced from each other. Preferably an adhesive is applied to the free faces of the individual tile elements and allowed to dry for some time.

As shown in FIG. 1, the underlying layer 2 is then placed into mold 1 and the individual tile elements 3 adhering to kraft paper 4 are placed on top thereof so that the glue coated surfaces of the tile elements and of the underlying layer contact each other.

As schematically shown in FIG. 2, the thus formed assembly is then vulcanized in the heated press by lowering the piston 5. For instance, with the composition described in Example I, vulcanization of layer 2 is effected within 25 minutes at a pressure of 20 kg. per square cm. and at a temperature of 145° C. During this operation, some of the material of underlying layer 2 will fill the interstices 6 between adjacent tile elements.

The thus formed assembly is then removed from the mold and cooled, kraft paper 4 is torn off and the composite tile plate is polished in order to remove the excess of the material of layer 2 from the upper surface of the composite plate. After cutting off rubbery material from the sides of the plate and pumicing the sides, the composite tile will have the exact dimensions desired and will have the appearance of composite plate 8 as illustrated in FIG. 3 wherein the rubber seams between individual tile elements 3 are indicated by reference numeral 7.

The laying of floors consisting of these composite tiles is a very simple procedure. The floor has to be even and smooth and then the composite tile plates can be laid by application of suitable glue in a manner similar to the laying of linoleum and thus not requiring the highly skilled and specialized operators required when tiles have to be laid onto mortar.

A floor covered with the above-described composite tile plates possesses acoustic and thermal insulating properties and, due to the seams 7 of the material of the underlying layer, the floor will remain non-skidding when wet.

Furthermore, due to the spacing of the individual tile elements and the flexibility of layer 2, it is also possible to adhere the composite tile plate to a rounded surface.

While the composite tile plate according to FIG. 3 has considerable advantages, nevertheless, certain difficulties arise because the single underlying layer must have acoustically insulating properties as well as a certain degree of flexibility. It is therefore preferred according to the present invention to proceed as illustrated in FIGS. 4–6 by forming two layers, namely, a lowermost or bottom layer of acoustically insulating material and a superposed vulcanized flexible layer in which the individual tile elements are embedded.

The intermediate layer is formed of a vulcanized mixture prepared in a rubber mixer which is then drawn into thin sheets, for instance, having a thickness of 2 mm. similar to sheet 2 of FIG. 1.

Again, the composition of the mixture may vary greatly. It will necessarily include a major proportion of natural rubber such as smoked sheets or crepe rubber, or synthetic rubber, for instance, butadiene-styrene rubber. Inert materials are added, for instance, cork and kaolin, plastifiers, anti-oxidants, vulcanization accelerators and the like substantially as described further above.

After cooling the thus prepared sheet, the same is cut to the dimensions of the mold, i.e., the length and width of the composite tile plate which is to be produced and possesses considerable mechanical strength.

The second or lowermost layer of the assembly is formed of an insulating material and is also cut to the dimensions of the composite tile plate. This second or lowermost layer, for instance, may be formed of cork or of an agglomeration of cork particles or of a mixture containing cork as the basic ingredient.

The assembling of the composite tile plate is illustrated in FIGS. 4 and 5 as comprising placing into mold 1′ first the second or insulating layer 2′ then superposing onto the layer 2′ the vulcanizable layer 3′ and finally the individual tile elements 4′ which preferably are adhered to a sheet of kraft paper 5′ or the like.

If desired, the individual layers and the free faces of the tile elements may be preliminarily adhesively adhered to each other.

Thereafter, as schematically illustrated in FIG. 5, the assembly is compressed in a heated press formed of mold 1′ and piston 6′.

During this operation, the upper vulcanizable layer 3′ rises between the spaced tile elements 4′ filling the interstices therebetween and, simultaneously, the entire material of upper layer 3′ is vulcanized. Thereby it is also achieved that insulating layer 2′ and flexible layer 3′ will be firmly adhered to each other.

The assembly can be completed in the heated press, for instance, in about 20 minutes at a pressure of 20 kg. per cm.$^2$ and at a temperature of 150° C. Thereafter, the thus formed mosaic type composite tile plate will be removed from the mold, allowed to cool and the sheet of kraft paper will be removed. The composite tile plate is then scraped and pumiced in order to remove any excess of the material of layer 2′ and is then ready for use.

The completed mosaic type composite tile plate is shown in FIG. 6 as including external seams 8′ on two sides of the plate in order to allow the laying and assembling of a floor or the like consisting of such composite tile plates, without requiring cutting into the tile plates themselves.

The exact dimensions of the entire flooring can be maintained by cutting off to the extent to which it is necessary portions of seams 8′.

The laying of the composite tile plates described herein is a very simple procedure and does not require highly skilled or specialized labor. It may be compared with the laying of linoleum rugs or plastic plates and is carried out by first providing a smooth surface onto which the composite tile plates are to be laid and then applying a suitable adhesive to the surface as well as to the free face of the lower insulating layer 2.

The thus obtained flooring has highly improved acoustically and thermally insulating properties and possesses non-skidding properties due to seams 7 and 8 forming part of the surface of the thus formed tile flooring.

The composite tile plate is of sufficient flexibility to allow adhering of the same to a rounded surface and, due to the vulcanized layer, possesses considerable mechanical strength.

Quite obviously, the lowermost layer of the composite tile plate may consist of a great variety of compositions having insulating properties and the interposed lower or upper layer in which tile elements are embedded may be of a great variety of vulcanizable compositions.

The following examples of the composition of layers of acoustically insulating material and of vulcanizable material are given as illustrative only without limiting the invention to the specific details of the example.

EXAMPLE II

The acoustically insulating layer may be formed of a mixture of 100 parts by weight of cork particles having a size of less than 4 mm. and between 10 and 20 parts, preferably 15 parts by weight of a thermosetting glue.

EXAMPLE III

The following table will give minimum, maximum and preferred proportions by weight of the constituents of the intermediate or second layer of vulcanizable material.

|  | Minimum | Maximum | Preferred |
|---|---|---|---|
| Krylene 602, Synthetic Rubber S.B.R. | 100 | 100 | 100 |
| Renacit, Pentachlorothiophenol | 0.5 | 1 | 1 |
| Coumarone, Coumarone Resin | 3 | 10 | 10 |
| Sulfur | 1 | 3 | 3 |
| Permanax, Mercapto Benzenediazole | 0.5 | 0.5 | 1 |
| Zinc Oxide | 1 | 10 | 5 |
| Maglite, Calcined Magnesia | 2 | 6 | 3 |
| P 45, Anhydrous Silica | 10 | 40 | 20 |
| Kaolin | 0 | 30 | 30 |
| Carbon Black | 0 | 10 | 10 |
| Chalk |  |  | 0.5 |
| Stearic Acid | 0.5 | 2 | 1 |
| Mineral Oil | 3 | 10 | 5 |
| Accelerator 201, Disulfide of Benzothiazyle | 0.5 | 1 | 1 |
| Accelerator 501, Disulfide of Tetramethylthiourame | 0.5 | 1 | 1 |
| Cork, Particle size less than 3.0 mm | 5 | 100 | 15 |

The assembly including the lowermost acoustically insulating layer of Example II and the vulcanizable material of Example III with the individual tile elements superposed thereon may be compressed and vulcanized so as to form the composite tile plate of the present invention by using the following pressures and temperatures:

|  | Minimum | Maximum | Preferred |
|---|---|---|---|
| Pressure, kg./cm.$^2$ | 8 | 10 | 8 |
| Temperature, ° C | 140 | 155 | 145 |

It will be understood that each of the elements described above, or two or more together, may also find a useful application in other types of composite plates differing from the types described above.

While the invention has been illustrated and described as embodied in a mosaic type composite tile plate, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A mosaic type composite tile plate, comprising, in combination, a bottom layer of acoustically insulating cork material having low resistance to mechanical stresses and being liquid-permeable; an upper layer consisting of a plurality of individual tile elements having upper faces and located spaced from each other in one plane above said bottom layer with said upper faces thereof exposed; and a vulcanized, flexible intermediate layer consisting essentially of a major proportion of plastic material interposed between and adhering to said bottom layer and to said individual tile elements and filling the interstices between the latter flush with said upper faces thereof, said vulcanized flexible layer having a resistance to mechanical stresses which is considerably higher than that of said bottom layer and being liquid-impermeable.

2. A tile plate as defined in claim 1, wherein said plastic material is rubber.

References Cited

UNITED STATES PATENTS

| | | | |
|---|---|---|---|
| 1,827,127 | 10/1931 | Weamer | 264—316 X |
| 2,017,587 | 10/1935 | Dennis | 52—389 |
| 2,052,229 | 8/1936 | Hyde | 52—309 |
| 2,266,510 | 12/1941 | Pottinger | 52—389 X |
| 2,298,983 | 10/1942 | Stabe | 52—384 |
| 2,336,235 | 12/1943 | Fischer | 52—593 X |
| 2,958,120 | 11/1960 | Taylor | 264—275 X |
| 3,097,080 | 7/1963 | Weir | 264—271 X |
| 3,131,514 | 5/1964 | Siek | 52—309 X |
| 3,177,273 | 4/1965 | Fingerhut et al. | 264—261 X |
| 3,185,748 | 5/1965 | Macdonald et al. | 52—390 X |
| 3,239,981 | 3/1966 | Fitzgerald | 52—392 X |

FOREIGN PATENTS 1,205,961  8/1959  France.

FRANK L. ABBOTT, *Primary Examiner.*

M. O. WARNECKE, *Assistant Examiner.*